United States Patent
DiGiovanni

[11] Patent Number: 5,949,941
[45] Date of Patent: Sep. 7, 1999

[54] CLADDING-PUMPED FIBER STRUCTURES

[75] Inventor: David John DiGiovanni, Montclair, N.J.

[73] Assignee: Lucent Technologies Inc., Murray Hill, N.J.

[21] Appl. No.: 08/976,003

[22] Filed: Nov. 21, 1997

[51] Int. Cl.⁶ ............................... G02B 6/02; H01S 3/07
[52] U.S. Cl. ................. 385/127; 385/1; 385/11; 385/123; 385/126; 385/128; 385/141; 385/142; 385/144; 372/6; 372/26; 359/341
[58] Field of Search ............................ 385/1, 4, 11, 123, 385/126, 127, 128, 141, 142, 144; 372/6, 26; 359/341

[56] References Cited

U.S. PATENT DOCUMENTS

| | | | |
|---|---|---|---|
| 5,121,460 | 6/1992 | Tumminelli et al. | 385/126 |
| 5,291,501 | 3/1994 | Hanna | 372/6 |
| 5,373,576 | 12/1994 | Minns et al. | 385/125 |
| 5,473,622 | 12/1995 | Grubb | 372/6 |
| 5,491,581 | 2/1996 | Roba | 359/341 |
| 5,530,709 | 6/1996 | Waarts et al. | 372/6 |
| 5,689,578 | 11/1997 | Yamauchi et al. | 385/123 |
| 5,703,987 | 12/1997 | Imoto | 385/126 |
| 5,708,669 | 1/1998 | Digiovanni et al. | 372/6 |
| 5,712,941 | 1/1998 | Imoto et al. | 385/126 |
| 5,742,722 | 4/1998 | Imoto | 385/126 |
| 5,864,644 | 1/1999 | DiGiovanni et al. | 385/43 |
| 5,864,645 | 1/1999 | Zellmer et al. | 385/126 |

*Primary Examiner*—Brian Healy
*Attorney, Agent, or Firm*—Mathews, Collins, Shepherd & Gould, P.A.

[57] ABSTRACT

A cladding-pumped fiber structure is disclosed in which mode mixing of pump light injected into the fiber is induced by index modulation. In one embodiment, the index modulation is created by a stress-inducing region disposed in the cladding which simultaneously maintains the polarization within the core to produce a polarization-maintaining fiber useful for multi-mode and laser applications.

22 Claims, 4 Drawing Sheets

CLADDING-PUMPED FIBER STRUCTURES

FIELD OF THE INVENTION

The present invention relates to cladding-pumped fiber structures having index modulation within a substantially circular outer diameter useful for laser applications, and also, in particular, to a cladding-pumped polarization-maintaining fiber useful in a laser device.

BACKGROUND OF THE INVENTION

Optical fibers are well known in the art and useful for many applications, including laser devices and amplifiers. Basically, an optical fiber comprises an inner core fabricated from a dielectric material having a certain index of refraction and a cladding surrounding the core. The cladding is comprised of a material having a lower index of refraction than the core. As long as the refractive index of the core exceeds that of the cladding, a light beam propagated along the core exhibits total internal reflection, and it is guided along the length of the core. In most practical applications, the refractive indices of the core and cladding differ from each other by only a few percent, which is advantageous for increasing the core diameter for use in single-mode applications.

Designs for optical fibers vary depending upon the application, the desired mode of transmission of the light beam, or the materials used in fabrication. To illustrate, fibers can be fabricated to propagate light of a single mode or multiple modes. Multi-mode fibers typically have a larger core diameter than single-mode fibers to enable a larger mode volume to pass through the fiber, and additional design constraints are posed by multi-mode applications, such as choice of the core and cladding refractive index profiles. The core and cladding can, for example, be of the step index, graded index, depressed clad, or W-type variety, which are characterized by the refractive index of the core relative to the cladding. Multi-core optical fibers also have been fabricated, including multiple cores disposed in arrays within a common cladding, as shown in U.S. Pat. No. 5,627,934 to Muhs, issued May 6, 1997, entitled "Concentric Core Optical Fiber with Multiple-Mode Signal Transmission"; and U.S. Pat. No. 4,000,416 to Goell, issued Dec. 28, 1976, entitled "Multi-Core Optical Communications Fiber," which employ multiple concentric cores primarily for security purposes.

Laser fibers comprise core-pumped and cladding-pumped fibers; that is, the light pumped into the fiber can be channeled directly to the core or it can be pumped into the cladding for reflection into the core. A cross-sectional view of a typical cladding pumped laser fiber is shown in FIG. 1A. As can be seen, typically in laser fibers, a rare-earth doped core 8 is used having a relatively high index of refraction, an example being $SiO_2:GeO_2$, with $GeO_2$ being added to raise the refractive index. The core is surrounded by a pure silica inner cladding 9, having a non-circular circumference, which typically is polygonal, and the cladding is coated with a polymer outer layer 10. Due to the polygonal shape of the inner cladding, light pumped into the total cross-sectional area of the fiber is reflected into the core to provide a laser. The non-circular shape of the inner cladding causes ray distortion and mode mixing of the light so that the light rays are directed to the core, i.e., if a circular inner cladding were used, pump modes of helical paths would be trapped in a path around the symmetrical cladding and not reach the core-to-cladding interface, as further explained in U.S. application Ser. No. 08/856,708, entitled "Cladding-Pumped Fiber Structure," filed May 15, 1997, by D. J. DiGiovanni (the inventor herein), pending, as a continuation of application Ser. No. 08/561,682, filed Nov. 22, 1995, assigned to Lucent Technologies, Inc. (the assignee herein), now abandoned, and incorporated herein by reference. Thus, the circular inner cladding is not effective for the cladding-pumped laser fiber.

The function of the polymer outer layer 10 in this instance (FIG. 1A) is both optical and mechanical, that is, as a protective coating it prevents niches or bends in the cladding from adversely impacting on its optical properties. However, it is generally known that a large difference in the index of refraction between the polymer outer layer 10 and inner cladding 9 is needed to ensure that light rays are contained within the fiber and reflected into the core. For example, the inner cladding 9 is typically fabricated with pure silica with a refractive index of about 1.45, and the refractive index of the polymer is typically about 1.38 or less. It has been understood that divergence in the refractive indices is necessary for use of the fiber as a cladding-pumped laser.

While there are functional benefits to be derived from using asymmetrical features and, in particular, a non-circular cladding, the manufacture of such fibers is complicated because it is difficult to achieve a non-circular cross-section for the inner cladding 9 while maintaining low-loss characteristics. Additionally, fibers having non-circular inner claddings present handling problems and difficulties associated with incorporation of the fibers into laser or amplifier devices.

Polarization-maintaining fibers also rely upon asymmetrical features, which likewise have presented manufacturing and handling difficulties. For example, difficulties associated with manufacturing a polarization-maintaining fiber having an elliptical-shaped core are noted in U.S. Pat. No. 5,482,525, to Kajioka et al., issued Jan. 9, 1996, entitled "Method of Producing Elliptic-Core Type Polarization-Maintaining Optical Fiber." In a polarization-maintaining fiber, two orthogonally polarized modes propagate down a fiber and asymmetrical features are used to maintain the polarization. Typically, this has been accomplished in a single-mode transmission fiber.

For example, shown below in FIGS. 1B to 1F are examples of prior art polarization-maintaining single mode fibers, all of which rely upon a cross-section for the fiber which is in some way asymmetrical to maintain polarization. FIG. 1B shows a fiber having an elliptical-shaped core 12, which is effective with regard to polarization properties, with a relatively short beat length, the beat length being a measure of the effectiveness of the polarization-maintaining properties of the fiber. As the light waves travel along the length of the fiber, their phase relationships change, affecting the polarization state of the modes. With polarization-maintaining fibers, after a certain length called the beat length, the original polarization will recur. Fibers having a large birefringence are known as "Hi-Bi" fibers. They desirably have relatively short beat lengths and are capable of maintaining a linear polarization state over large distances.

In FIGS. 1C to 1D, there is shown an asymmetric region outside the core, the asymmetric region being stress-inducing regions 13 disposed within the inner cladding in FIGS. 1C and 1D. The commonly-used polarization-maintaining fiber of FIG. 1C is called the bow tie type, which is usually fabricated with a gas phase etching process, and FIG. 1D is called the panda type, which incorporates borosilicate rods in the cladding. In FIGS. 1E and 1F, the outer cladding 14 is rectangular-shaped. These are identified as being of the flat-cladding type, involving a non-circular outer cladding diameter, which have been contemplated for improving coupling properties of optical integrated circuits.

As noted, such polarization-maintaining fibers typically have been used for single-mode transmission fiber and present manufacturing and/or handling difficulties. Accordingly, there is a need for a laser fiber having a circular inner cladding and a polarization-maintaining fiber useful in a laser or amplifier having index modulation within a circular inner cladding. The invention addresses these needs. Further advantages may appear more fully upon consideration description below.

SUMMARY OF THE INVENTION

Summarily described, the invention embraces a double clad laser fiber comprising a rare-earth core, a non-circular inner cladding, a circular outer cladding, and an outer polymer layer, wherein the index of refraction of the circular outer cladding is less than that of the inner cladding. Applicants have discovered that with this configuration mode mixing of light can be accomplished through index modulation. Applicants have further discovered a fiber configuration in which stress-inducing regions disposed within the inner cladding produce both ray distortion and birefringence to define a polarization-maintaining fiber useful for laser applications.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

Applicants have discovered that a laser fiber may be fabricated with a circular outer cladding based on index modulation. Applicants have further discovered that a polarization-maintaining optical fiber may be fabricated for use in laser applications via a cladding-pumped fiber having stress-inducing regions within the cladding. Applicants have discovered that the stress-inducing regions produce both ray distortion and birefringence to define a polarization-maintaining fiber useful for laser applications.

Single mode cladding-pumped fibers are illustrated in U.S. patent application Ser. No. 08/897,195, now U.S. Pat. No. 5,864,644, filed Jul. 21, 1997, by D. J. DiGiovanni (the inventor herein), and A. Stentz, titled "Tapered Fiber Bundles for Coupling Pump Diodes to Cladding-Pumped Fibers," assigned to Lucent Technologies, Inc. (the assignee herein), and incorporated herein by reference. In that application, double-clad fibers are shown having a single-mode, rare-earth doped core surrounded by a silica inner cladding that is further surrounded by a lower index outer cladding. Pumped light is coupled into the inner cladding; the inner cladding is typically non-circular. This invention uses a core designed for laser applications and a configuration involving a non-circular inner cladding surrounded by a lower index outer cladding, wherein pumped light is coupled into the core for a laser. Additionally, double-clad and triple-clad fiber structures are disclosed in U.S. application Ser. Nos. 08/561,682, now abandoned, and 08/856,708, pending, filed by D. J. DiGiovanni, the inventor herein, cited previously and incorporated herein by reference.

Figure 1A:
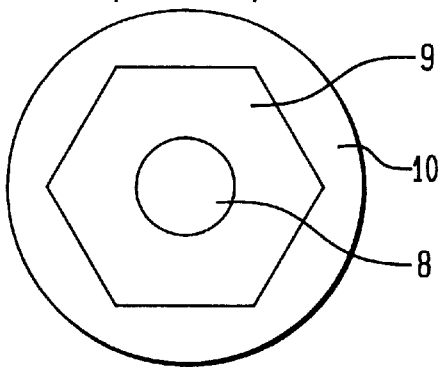
FIG. 1A shows a cross-sectional view of a prior art laser fiber.
Figure 1B:
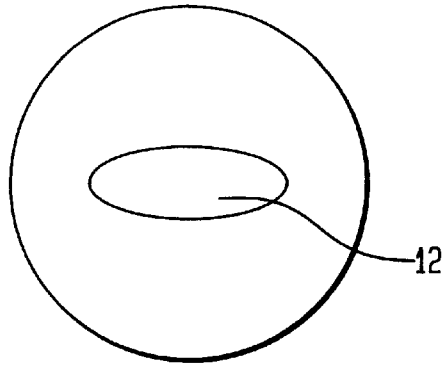
FIGS. 1B, 1C, 1D, 1E, and 1F show cross-sectional views of prior art single-mode transmission polarization-maintaining optical fibers.
Figure 1C:
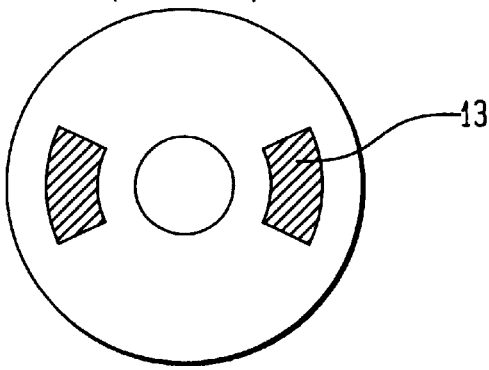
Figure 1D:
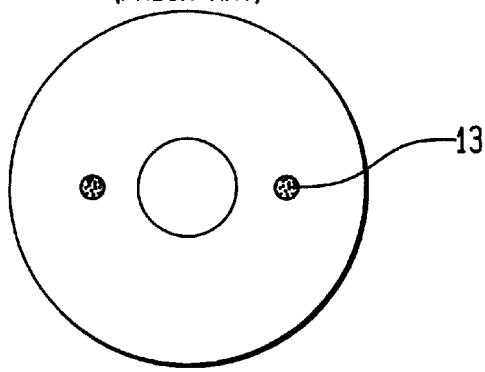
Figure 1E:
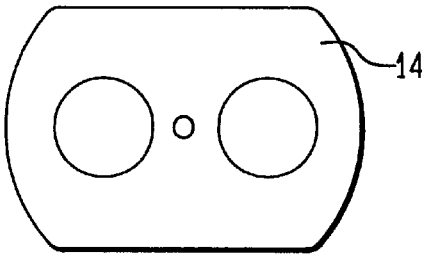
Figure 1F:
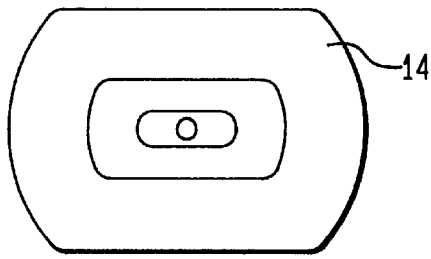
Figure 2:
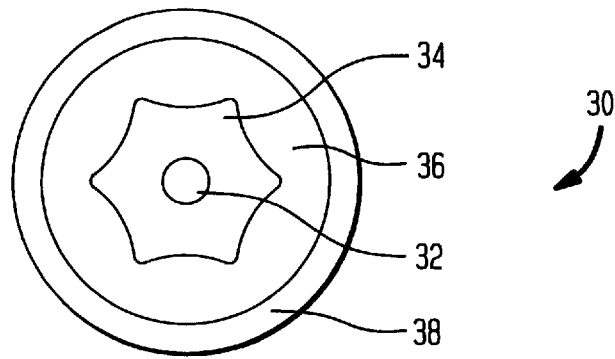
FIG. 2 shows a cross-sectional view of an inventive double-clad laser fiber.

Referring to FIG. 2, the inventive laser fiber 30 has a rare-earth doped core 32, surrounded by an asymmetrical first inner cladding 34 and a second cladding 36. The inner cladding 34 is shown configured as a modified hexagon having rounded edges, which is preferred, although other asymmetrical shapes are contemplated. The core should be comprised of a material having a relatively high index of refraction, for example, a $SiO_2$:$GeO_2$ core may be used, with $GeO_2$ being added to raise the refractive index. Preferably, the core is doped with one or more of Ge, Al, B, P, Ga, La, and has a high concentration of rare-earth dopants, as described in U.S. Pat. No. 4,666,247 to MacChesney et al., titled "Multiconstituent Optical Fiber," issued May 19, 1987 (assigned to a predecessor of the assignee herein), which is hereby incorporated by reference. The inner cladding 34 is comprised of a material having a lower index of refraction than the core, and may be undoped silicate glass. A second cladding 36 surrounds the first inner cladding 34. The second cladding 36 has a substantially circular outer circumference and is comprised of a material having a lower index of refraction than either the core or the first inner cladding 34, such as fluoro-silica glass, or a borosilicate glass. Thus, the refractive indices of the layers become progressively less moving from the core to the second cladding 36.

Applicants have discovered that with this configuration, the first inner and second claddings cause mode mixing due to refractive index changes. Further, mode mixing occurs with relatively minor variations in the refractive indices between the inner cladding 34 and second cladding 36. For example, an inner cladding having a refractive index of approximately 1.45 (for pure silica), can be combined with a second cladding having a refractive index within the range of from 1.44 to 1.38. An outer polymer coating layer 38, preferably has an even lower refractive index, although this is not essential. The polymer coating 38 should not have a higher index of refraction as compared with the second cladding 36 for the most effective device, though it may be higher and still operable.

Figure 3A:
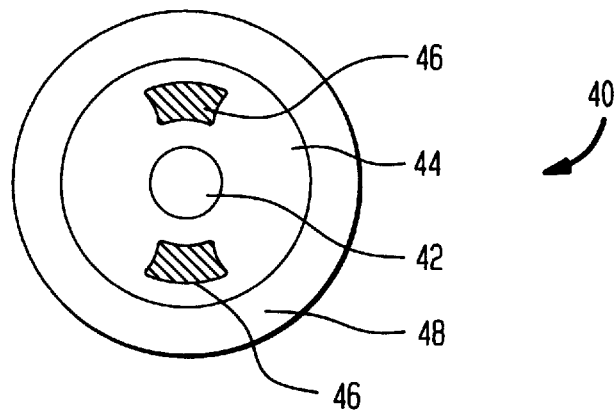
FIGS. 3A–3D show cross-sectional views of alternative embodiments of the inventive polarization-maintaining optical fiber.
Figure 3B:
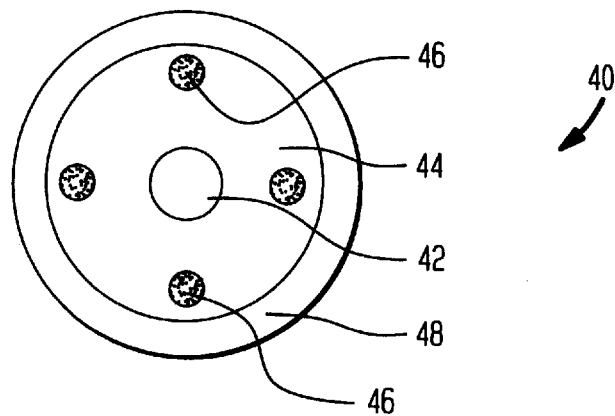

Referring to FIGS. 3A and 3B, there are shown cross-sections of the inventive polarization-maintaining fiber 40, which provides advantages in that it can be used as a cladding pumped fiber structure and for a laser. The invention comprises a core 42, a cladding 44 comprised of a silica glass, and a plurality of stress-inducing regions 46 disposed in the cladding. A substantially circular outer polymer layer 48 protects the fiber. The core should be comprised of a material having a relatively high index of refraction, for example, a $SiO_2$:$GeO_2$ core may be used, with $GeO_2$ being added to raise the refractive index.

Figure 3C:
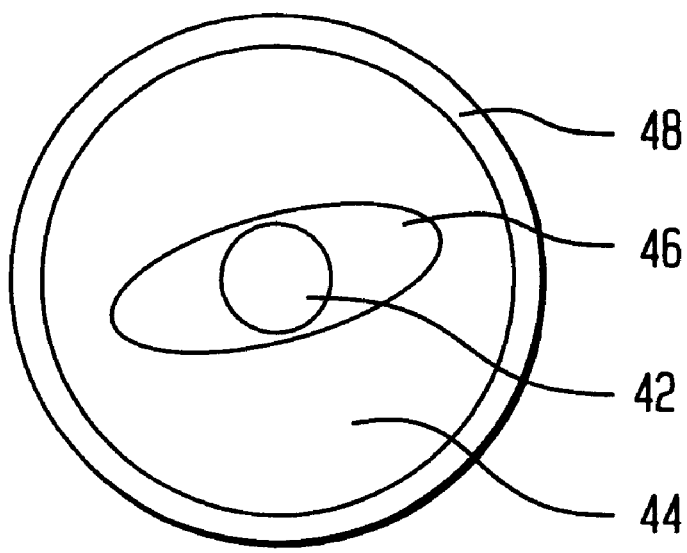
Figure 3D:
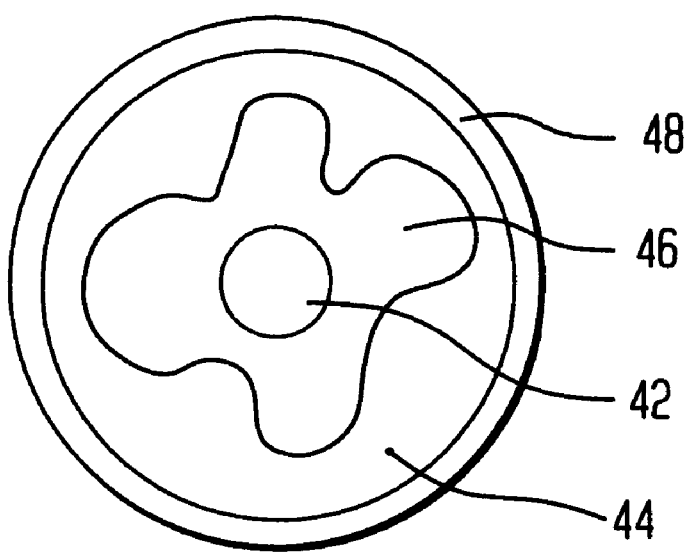

The stress-inducing region may comprise a plurality of substantially non-circular isolated regions suspended within the cladding 44, as shown in FIGS. 3A and 3B. For example, the stress-inducing regions may comprise a modified bow-tie configuration (FIG. 3A). Alternatively the stress-inducing region may comprise a substantially non-circular region concentrically surrounding the core as in FIGS. 3C-3D. The non-circular stress-inducing region can be fabricated in a variety of shapes, and it is not necessary to control the configuration during fabrication. Rather, the stress-inducing region can be amorphous, without any clearly defined shape, as in FIG. 3D, thereby avoiding manufacturing difficulties associated with obtaining a particular configuration. In any case, the stress inducing region should be comprised of a material having a different index of refraction than the core. For example, it could have a higher index, as with the use of aluminosilica glass, or lower index, such as with borosilicate glass, or air could be used. The index of refraction different from that of the inner-cladding causes mode-mixing of pump light injected into and guided along the inner cladding.

With this embodiment, the outer polymer layer 48 is comprised of a material having a low index of refraction and preferably, the index of refraction of this layer is as low as possible. Applicants have discovered that with this configuration, the stress-inducing region or plurality of stress-inducing regions not only produce birefringence but also cause ray distortion for reflecting pumped light to the core and producing a laser fiber, as with the asymmetrical circumference of the inner cladding 34 of FIG. 2.

Figure 4:
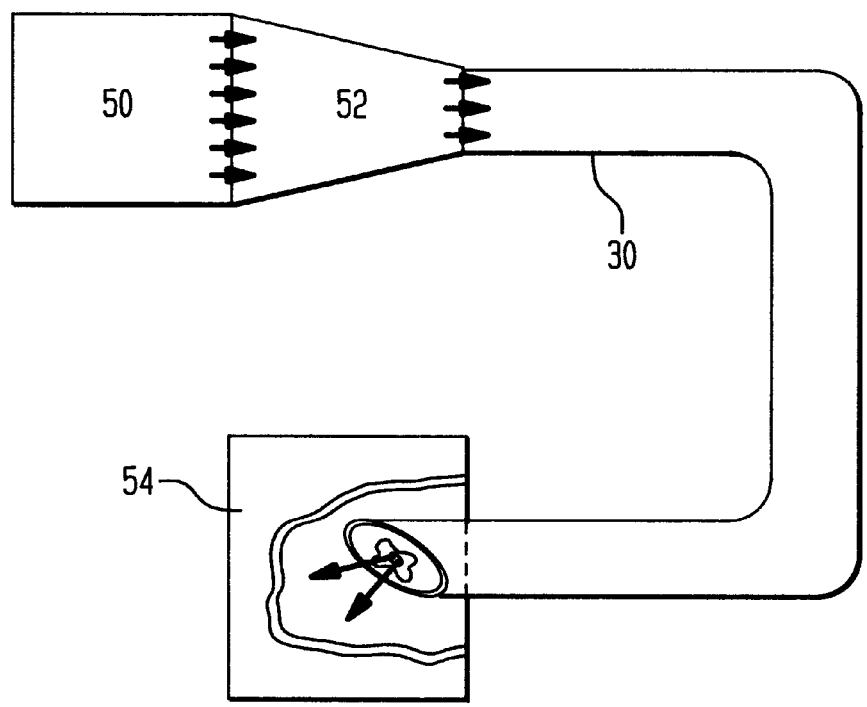
FIG. 4 schematically illustrates use of the invention as a laser.
Figure 5:
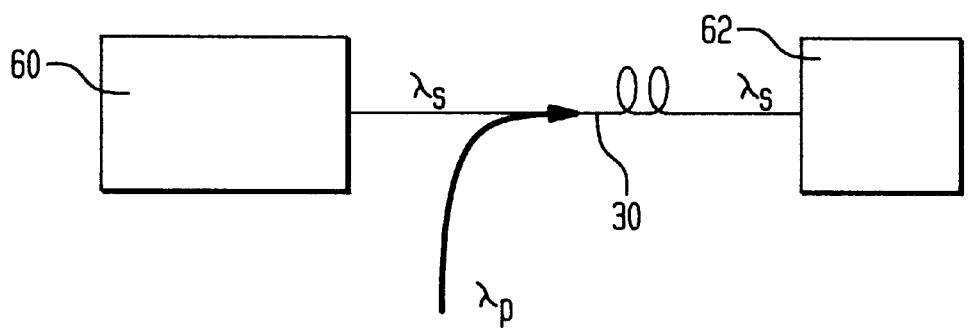
FIG. 5 schematically illustrates use of the invention as an amplifier.

It will be appreciated that the cladding-pumped fiber of FIGS. 2-3 will generally be part of an optical fiber communication system that further comprises such conventional elements as a transmitter and a receiver and an optical path connecting transmitter and receiver. For example, referring to FIG. 4, there is schematically illustrated use of the fiber as a laser for use in an optical fiber communication system. A light source or light-emitting diode 50 is provided for multi-mode transmission of light beams. A coupler 52 connects the light source 50 to the fiber 30. With this invention, the coupler may comprise multi-mode transmission fibers, and it is not necessary to provide a single-mode transmission fiber for pumping light to the fiber core, as schematically illustrated. Many configurations are known for couplers which may comprise fiber bundles, for example. In operation, the light source 50 emits multi-mode lights beams and the coupler 52 pumps the light to the fiber cross-section, including the cladding. With the asymmetrical crosssection and stress-inducing regions of the fiber as previously described, the light is reflected in the core and polarization may be maintained. The fiber may be coupled to an output device 54, the configuration of which naturally will depend on the application and may, for example, comprise a waveguide modulator, receiver, detector, fiber optic splitter, and so forth. Light is emitted to the output device 54 from the fiber core as schematically illustrated and may comprise multi-mode polarized light beams. Referring to FIG. 5, there is schematically illustrated use of the fiber as an amplifierr for use in an optical fiber communication system, involving coupling of signal light $\lambda_s$ and pump light $\lambda_p$ into the fiber 30. The fiber 30 comprises an optical fiber transmission path connecting transmitter 60 and receiving 62, wherein signal light $\lambda_s$ is transmitted to the core and pump light $\lambda_p$ to the cladding, as schematically shown in FIG. 5.

It will be understood that the embodiments described herein are merely exemplary and that a person skilled in the art may make variations and modifications without departing from the spirit and scope of the invention. All such variations and modifications are intended to be included within the scope of the appended claims.

I claim:

1. An article comprising a cladding-pumped fiber, comprising
    a core fabricated with a rare-earth material having a predetermined refractive index;
    an inner cladding surrounding the core having an asymmetrical outer circumference and a refractive index that is less than the refractive index of the core;
    a second cladding surrounding the inner cladding having a substantially circular outer circumference and a refractive index that is less than the refractive index of the inner cladding, wherein index modulation between the inner cladding and outer cladding causes distortion of light rays pumped into the fiber to direct the rays to the core; and
    an outer polymer layer for protecting the fiber.
2. The article according to claim 1, in which the inner cladding is comprised of undoped silicate glass.
3. The article according to claim 2, in which the second cladding is comprised of fluorosilica or borosilicate glass.
4. The article of claim 3 in which the core is comprised of $SiO_2$ doped with one or more elements selected from the group Ge, Al, B, P, Ga, and La.
5. The article according to claim 1, wherein the outer polymer layer has a refractive index that is less than that of the second cladding.
6. The article according to claim 1, wherein the outer polymer layer has a refractive index that is greater than that of the second cladding.
7. The article according to claim 1 wherein the article comprises a laser.
8. The article according to claim 4 wherein the article comprises a laser.
9. The article according to claim 1 wherein the article comprises an amplifier.
10. The article according to claim 1 wherein the article comprises an optical communications system.
11. An article comprising a polarization-maintaining cladding-pumped fiber comprising:
    a core at least a portion of which has a predetermined refractive index;
    an inner cladding surrounding the core having a refractive index which is less than the refractive index of the core, the inner cladding having disposed therein a substantially non-circular stress-inducing region having a refractive index different from that of the inner cladding for causing both birefringence in the core and distortion of rays in the inner cladding so that pump modes are reflected into the core and polarization is maintained within the core; and
    an outer polymer layer having a refractive index that is less than that of the inner cladding.
12. The article of claim 11, wherein the stress-inducing region comprises a plurality of non-concentric regions disposed in the inner cladding.
13. The article of claim 11, wherein the stress-inducing region comprises a non-circular region surrounding the core.
14. The article according to claim 11, in which the inner cladding is comprised of glass.
15. The article of claim 12, in which the plurality of stress-inducing regions have refractive indices higher than the refractive index of the inner cladding.
16. The article of claim 12, in which the plurality of stress-inducing regions have refractive indices lower than the refractive index of the inner cladding.
17. The article of claim 12, in which the plurality of stress-inducing regions comprise air.

18. The article of claim 13, in which the plurality of stress-inducing region has a refractive index higher than the refractive index of the inner cladding.

19. The article of claim 13, in which the stress-inducing region has a refractive index higher than the refractive index of the inner cladding.

20. The article according to claim 10 comprising a laser.

21. The article according to claim 10 comprising an amplifier.

22. The article according to claim 10 comprising an optical communications system.

* * * * *